United States Patent
Hui et al.

(10) Patent No.: US 8,861,390 B2
(45) Date of Patent: Oct. 14, 2014

(54) ESTIMATED TRANSMISSION OVERHEAD (ETO) METRICS FOR VARIABLE DATA RATE COMMUNICATION LINKS

(75) Inventors: Jonathan W. Hui, Foster City, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 247 days.

(21) Appl. No.: 13/191,617

(22) Filed: Jul. 27, 2011

(65) Prior Publication Data

US 2013/0028104 A1    Jan. 31, 2013

(51) Int. Cl.
| | | |
|---|---|---|
| H04Q 11/00 | (2006.01) | |
| H04L 12/825 | (2013.01) | |
| H04L 12/753 | (2013.01) | |
| H04L 12/801 | (2013.01) | |
| H04L 12/721 | (2013.01) | |
| H04W 84/18 | (2009.01) | |
| H04W 4/00 | (2009.01) | |

(52) U.S. Cl.
CPC ............... H04L 47/25 (2013.01); *H04L 47/34* (2013.01); *H04L 45/123* (2013.01); *H04W 84/18* (2013.01); *H04W 4/006* (2013.01); H04L 45/48 (2013.01)
USPC ..................................................... 370/252

(58) Field of Classification Search
USPC .................. 370/252, 311, 330, 355, 356, 392
See application file for complete search history.

(56) References Cited

U.S. PATENT DOCUMENTS

| | | |
|---|---|---|
| 6,845,102 B1 | 1/2005 | Bendelac et al. |
| 7,146,186 B1 | 12/2006 | Moon et al. |
| 7,295,844 B1 | 11/2007 | Moon et al. |
| 7,564,856 B2 | 7/2009 | Bendelac et al. |
| 7,738,873 B2 | 6/2010 | Jagadeesan et al. |
| 7,924,722 B2 | 4/2011 | Thubert et al. |

(Continued)

OTHER PUBLICATIONS

"Routing in Multi-Radio, Multi-Hop Wireless Mesh Networks", 2004, Richard Daves, Microsoft Research.*

(Continued)

*Primary Examiner* — Hassan Kizou
*Assistant Examiner* — Abdullahi Ahmed
(74) *Attorney, Agent, or Firm* — Edwards Wildman Palmer LLP; James M. Behmke; Stephen D. LeBarron (57) ABSTRACT

In one embodiment, an expected transmission count (ETX) link metric is computed for a link between a transmitter and a receiver in a communication network, the ETX representative of an expected number of transmissions necessary for a message to be successfully received by the receiver over the link, and a data rate of the link at which the ETX is computed is also determined. From these, an estimated transmission overhead (ETO) link metric for the link may be computed by dividing the ETX by the data rate. In one embodiment, the data rate of the link may be adjusted based on the ETO (e.g., to minimize the ETO). In another embodiment, routes through the communication network may be selected based on ETO values along the route.

17 Claims, 10 Drawing Sheets

(56) References Cited

U.S. PATENT DOCUMENTS

| | | | | |
|---|---|---|---|---|
| 8,184,584 B2* | 5/2012 | Kondo et al. | | 370/330 |
| 8,335,164 B2* | 12/2012 | Liu | | 370/252 |
| 8,335,166 B2* | 12/2012 | Xu et al. | | 370/252 |
| 8,532,023 B2* | 9/2013 | Buddhikot et al. | | 370/328 |
| 2008/0279101 A1* | 11/2008 | Wu et al. | | 370/235 |
| 2009/0147722 A1* | 6/2009 | Ramachandran | | 370/315 |
| 2009/0175193 A1 | 7/2009 | Shaffer et al. | | |
| 2009/0313535 A1 | 12/2009 | Bendelac et al. | | |
| 2010/0128628 A1* | 5/2010 | Wu et al. | | 370/252 |
| 2010/0157864 A1* | 6/2010 | Salomone et al. | | 370/311 |
| 2012/0320919 A1* | 12/2012 | Baliga et al. | | 370/392 |
| 2013/0128757 A1* | 5/2013 | Chowdhary et al. | | 370/252 |

OTHER PUBLICATIONS

"RPL: IPv6 Routing Protocol for Low Power and Lossy Networks" <draft-ietf-roll-rpl-19> by Winter, at al. (Mar. 13, 2011 version).

"Routing Metrics used for Path Calculation in Low Power and Lossy Networks" <draft-ietf-roll-routing-metrics-19> by Vasseur, et al. (Mar. 1, 2011 version).

"RPL Objective Function 0" <draft-ietf-roll-of0-15> by Thubert (Jul. 8, 2011 version).

"The Minimum Rank Objective Function with Hysteresis" <draft-ieff-roll-minrank-hysteresis-of-04> by O. Gnawali et al. (May 17, 2011 version).

\* cited by examiner

ESTIMATED TRANSMISSION OVERHEAD (ETO) METRICS FOR VARIABLE DATA RATE COMMUNICATION LINKS

TECHNICAL FIELD

The present disclosure relates generally to communication networks, and, more particularly, to link metrics for variable data rate links in communication networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

LLN link technologies are often capable of transmitting packets using different data rates (e.g., IEEE 802.15.4g and G3 power-line communication or "PLC"). For example, an LLN device may select a different data rate based on the intended receiver of the message. A challenge associated with utilizing variable data rates is that the data rate also affects the communication range and reliability of delivering packets to its intended receiver. In particular, increasing the data rate tends to reduce the reliability and communication range. As a result, devices must make a tradeoff between data rate and communication range when choosing a data rate for transmission. In addition, because the transmission data rate can affect communication range, the data rate also affects the link topology. As a result, the routing protocol must consider the net effect of different transmission data rates.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an expected transmission count (ETX) link metric is computed for a link between a transmitter and a receiver in a communication network, the ETX representative of an expected number of transmissions necessary for a message to be successfully received by the receiver over the link, and a data rate of the link at which the ETX is computed is also determined. From these, an estimated transmission overhead (ETO) link metric for the link may be computed by dividing the ETX by the data rate. In one embodiment, the data rate of the link may be adjusted based on the ETO (e.g., to minimize the ETO). In another embodiment, routes through the communication network may be selected based on ETO values along the route.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

Figure 1:
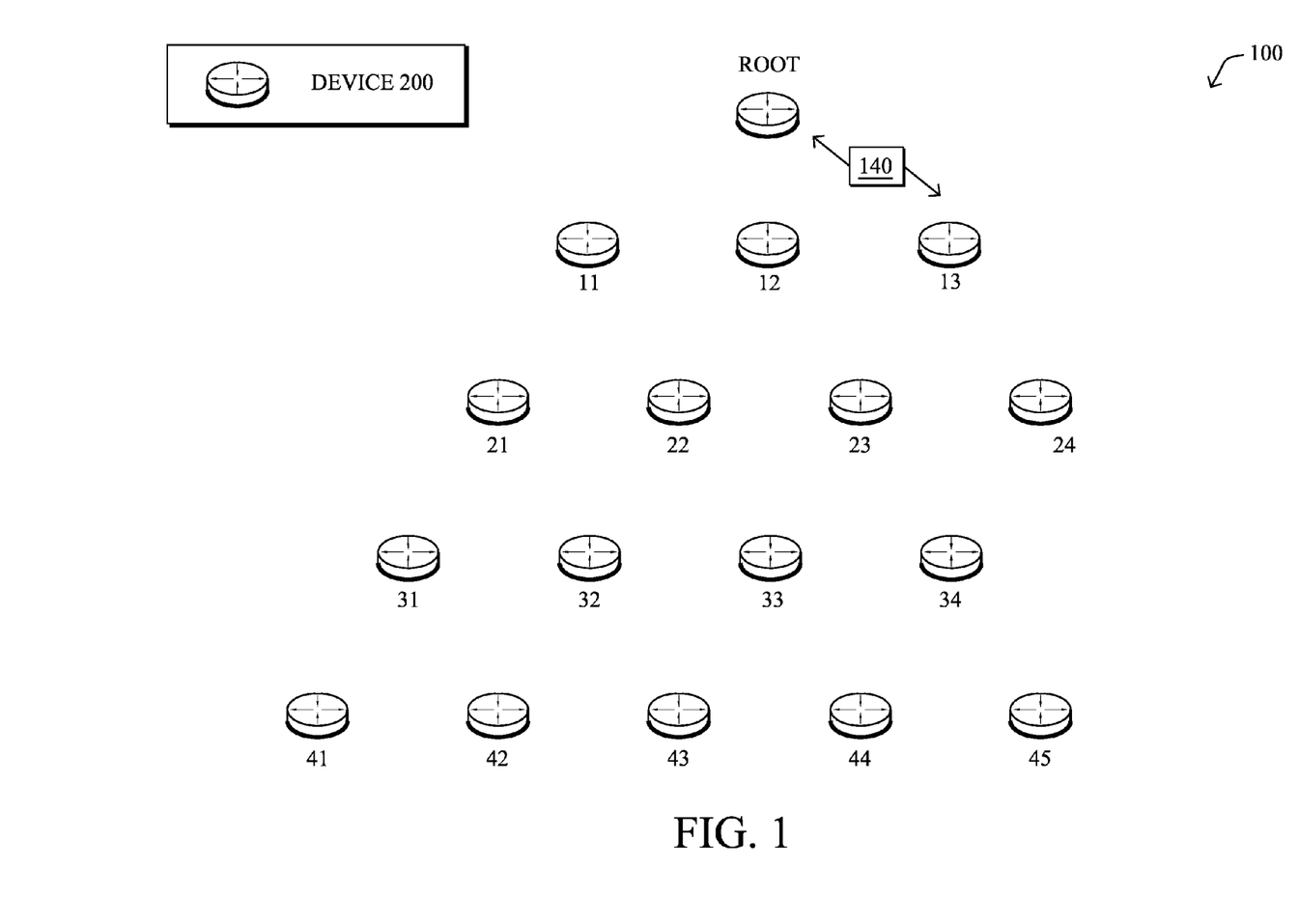
FIG. 1 illustrates an example communication network.

FIG. 1 is a schematic block diagram of an example computer network 100 illustratively comprising nodes/devices 200 (e.g., labeled as shown, "root," "11," "12," ... "45," and described in FIG. 2 below) interconnected by various methods of communication. For instance, the links (not shown for clarity) may be shared media (e.g., wireless links, PLC links, etc.), where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity.

Data packets 140 (e.g., traffic and/or messages sent between the devices/nodes) may be exchanged among the nodes/devices of the computer network 100 using predefined network communication protocols such as certain known wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
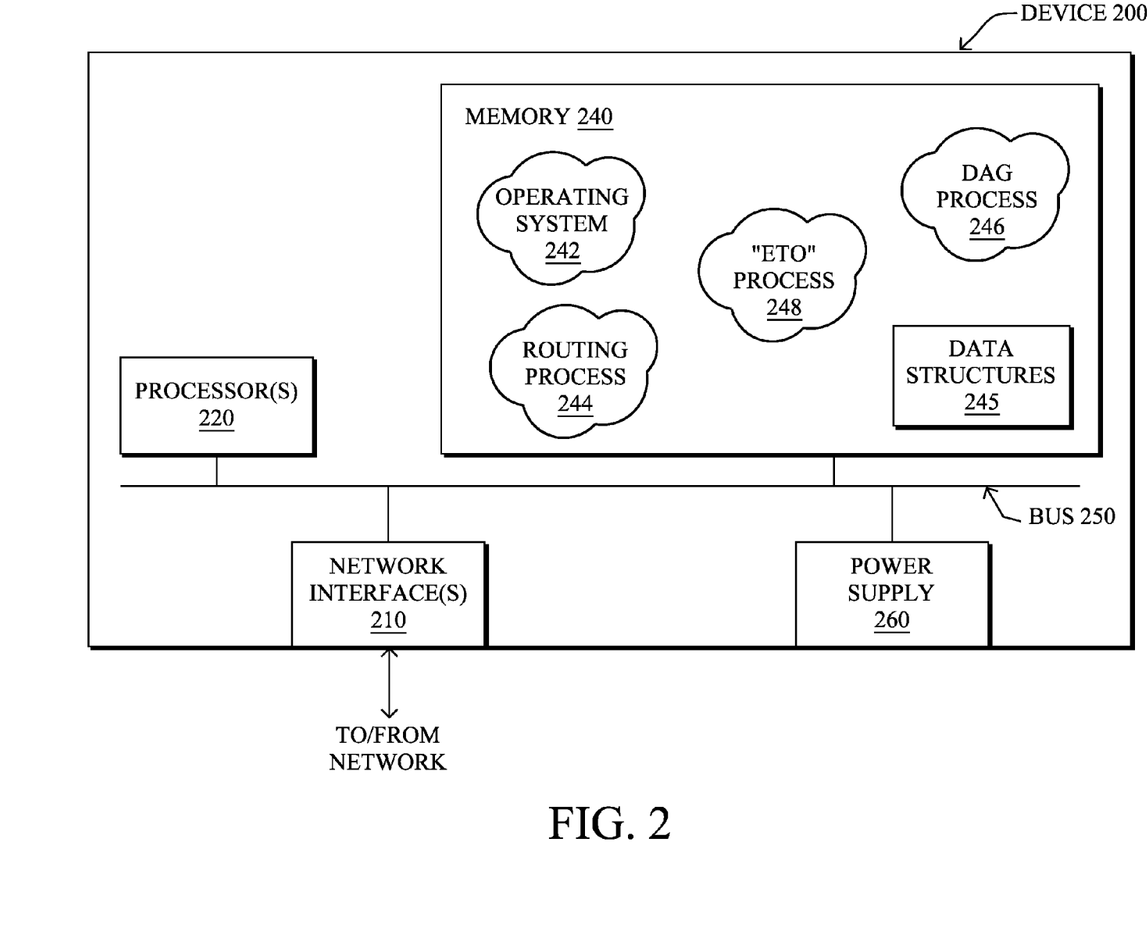
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246, and an illustrative "ETO" process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietf-roll-routing-metrics-19> by Vasseur, et al. (Mar. 1, 2011 version). Further, an example OF (e.g., a default OF) may be found in an IETF Internet Draft, entitled "RPL Objective Function 0" <draft-ietf-roll-of0-15> by Thubert (Jul. 8, 2011 version) and "The Minimum Rank Objective Function with Hysteresis" <draft-ietf-roll-minrank-hysteresis-of-04> by O. Gnawali et al. (May 17, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
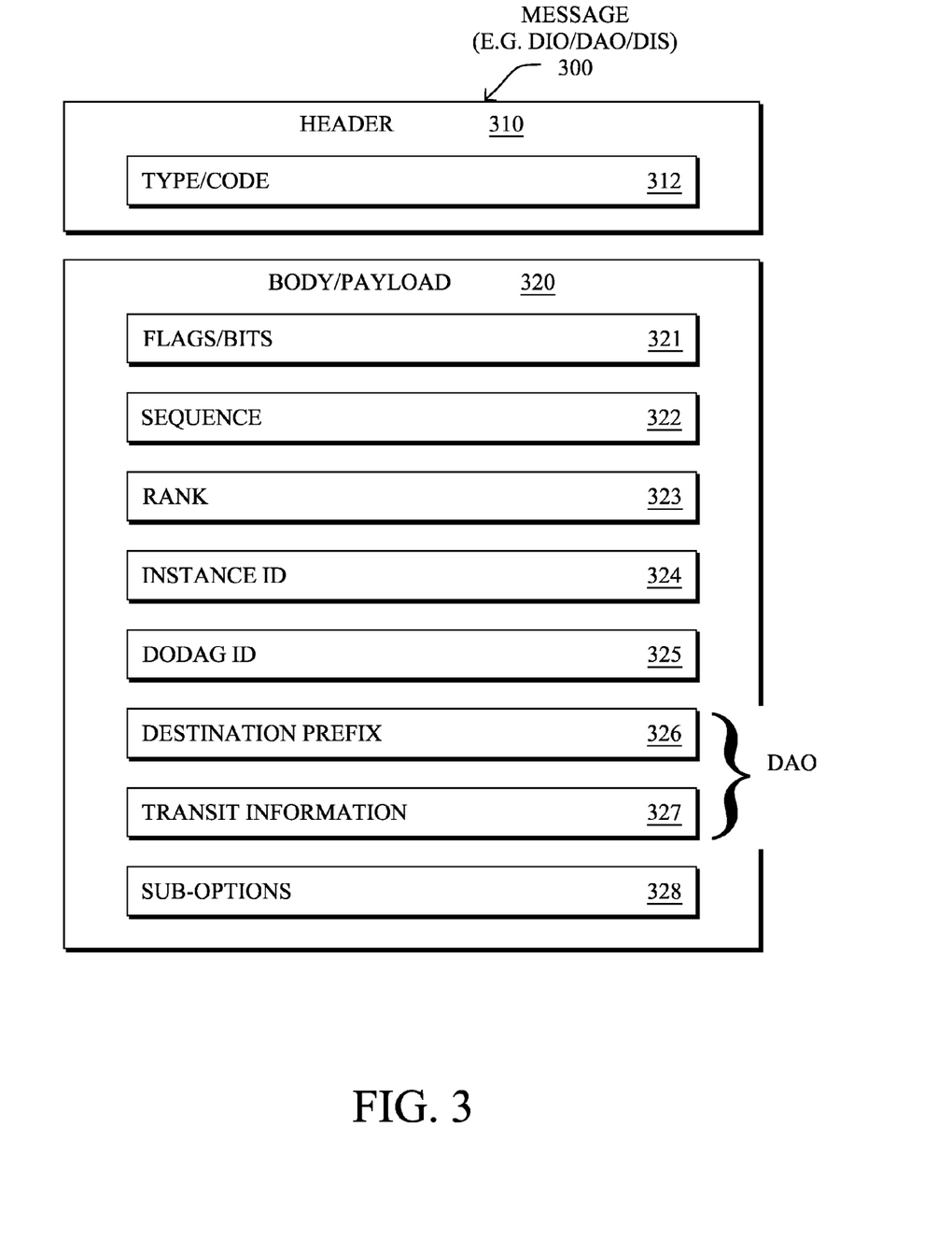
FIG. 3 illustrates an example message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
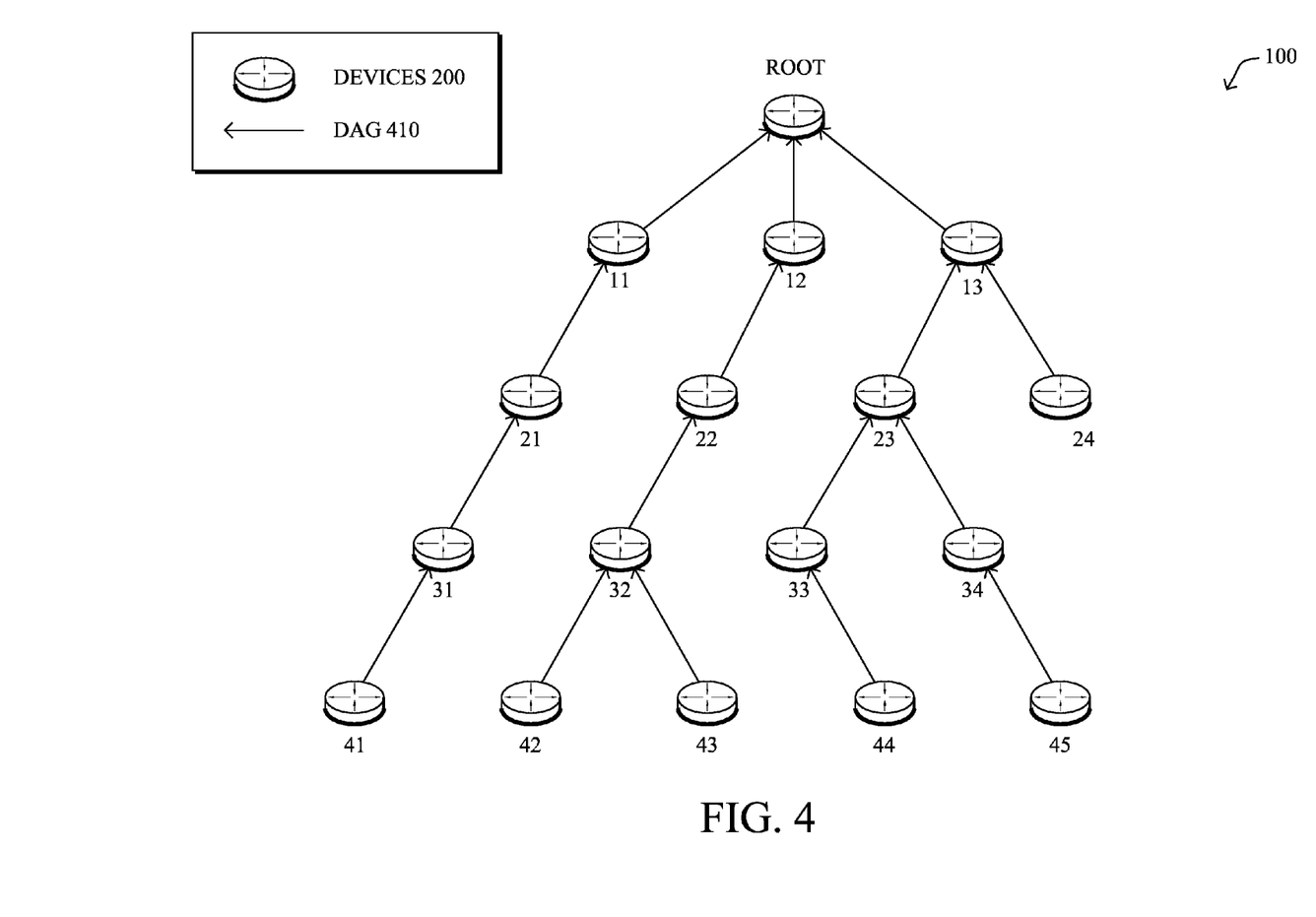
FIG. 4 illustrates an example directed acyclic graph (DAG) in the communication network as in FIG. 1.

FIG. 4 illustrates an example simplified DAG that may be created, e.g., through the techniques described above, within network 100 of FIG. 1. For instance, certain links may be selected for each node to communicate with a particular parent (and thus, in the reverse, to communicate with a child, if one exists). These selected links form the DAG 410 (shown as arrows in the UPWARD direction toward the root), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

As noted above, LLN link technologies are often capable of transmitting packets using different data rates (e.g., IEEE 802.15.4g and G3 PLC). For example, an LLN device may select a different data rate based on the intended receiver of the message. A challenge associated with utilizing variable data rates is that the data rate also affects the communication range and reliability of delivering packets to its intended receiver. In particular, increasing the data rate tends to reduce the reliability and communication range. As a result, devices must make a tradeoff between data rate and communication range when choosing a data rate for transmission. In addition, because the transmission data rate can affect communication range, the data rate also affects the link topology. As a result, the routing protocol must consider the net effect of different transmission data rates. For example, while increasing the link-layer data rate may increase throughput across an individual link, it may increase the number of hops required to reach the destination.

A number of different routing metrics have been proposed and used in LLNs. Some have been borrowed from experience with wired networks. However, none provide a satisfactory solution for variable data rate links in LLNs.

1) Hop count metrics are not sufficient because they do not accurately reflect link reliability, channel utilization, and data rate across links of a path.
2) Communication latency and throughput metrics are not sufficient because they do not directly reflect reliability or channel utilization of a path.
3) Perhaps the most commonly used metric used in LLNs today is the Expected Transmission Count (ETX), which represents the expected number of transmissions to successfully deliver a message across a link. This metric has been preferred in LLNs because it reflects link reliability and channel utilization. Accounting for channel utilization is especially important in LLNs because the communication medium is a shared resource among all neighboring devices. However, ETX does not reflect differences in link data rates.

Estimated Transmission Overhead (ETO)

The techniques herein generally allow a routing protocol to optimize routes across variable data rate links, e.g., in LLNs, particularly by defining an improved path cost metric that effectively incorporates the net effect of variable transmission data rates. For instance, link reliability is important to reflect, as LLN links typically vary greatly in their reliability, and channel utilization is also important, as the communication medium is a shared and constrained resource. The techniques herein, therefore, specify a new link metric, called the Estimated Transmission Overhead (ETO) link metric, which may be used in systems for route selection and to dynamically adjust the data rate. As described herein, the ETO metric simultaneously reflects the reliability, channel utilization, latency, and throughput of links along a path.

Specifically, according to one or more embodiments of the disclosure as described in detail below, an expected transmission count (ETX) link metric is computed for a link between a transmitter and a receiver in a communication network, the ETX representative of an expected number of transmissions necessary for a message to be successfully received by the receiver over the link, and a data rate of the link at which the ETX is computed is also determined. From these, an estimated transmission overhead (ETO) link metric for the link may be computed by dividing the ETX by the data rate. In one embodiment, the data rate of the link may be adjusted based on the ETO (e.g., to minimize the ETO). In another embodiment, routes through the communication network may be selected based on ETO values along the route. (These embodiments may be applied simultaneously and do not have to be mutually exclusive.)

Illustratively, the techniques described herein may be performed by hardware, software, and/or firmware, such as in accordance with the ETO process 248, which may contain computer executable instructions executed by the processor 220 to perform functions relating to the novel techniques described herein, e.g., in conjunction with routing process 244 (and/or DAG process 246). For example, the techniques herein may be treated as extensions to conventional protocols, such as the various transmission protocols (e.g., wireless or PLC communication protocols), and as such, may be processed by similar components understood in the art that execute those protocols, particularly to compute link metrics and make routing decisions based thereon, accordingly. Note that while process 248 is shown as a standalone process in centralized memory 240, those skilled in the art will appreciate that the process may be a sub-process within another process (e.g., routing process 244), and/or may be located within the network interfaces 210, such as within various layer-based processes, such as a physical layer ("PHY"), media access control layer ("MAC"), link layer, etc., as may be appreciated by those skilled in the art.

Operationally, the techniques herein address the issue of optimizing routes across links with variable transmission data rates in a LLN. To achieve this goal, LLN devices must be able to determine link characteristics (e.g., reliability and channel utilization) based on different transmission data rates. With this information, LLN devices can then determine the proper tradeoff between reliability, channel utilization, latency, and throughput in selecting a transmission data rate to a particular neighbor. Projecting this information to the routing protocol allows it to optimize routes across a LLN.

The techniques herein generally involve the following components, as described in greater detail below:

1) Defining a new link/path cost metric to effectively characterize LLN paths composed of links with different data rates;
2) Discovering neighboring routers;
3) Determining a data rate when communicating to a neighbor;
4) Determining whether to utilize a recorded or aggregated routing metrics; and
5) Route selection.

===Expected Transmission Overhead (ETO) Metric===

According to the embodiments herein, a new link metric is defined that reflects link reliability, channel utilization, latency, and transmission data rates using a single scalar value. We call this metric the Expected Transmission Overhead (ETO). Whereas the ETX metric reflects the expected number of transmissions to deliver a message across the link, i.e., to be successfully received by the receiver over the link, the ETO metric reflects the expected amount of time utilizing the physical medium to successfully deliver a message to the intended receiver. The ETO metric may be approximated by first computing the ETX metric then dividing it by the link's data rate (at which the ETX is computed), i.e., ETO=ETX/DataRate. Note that the techniques herein may dynamically adjust the data rate, which is described below.

With a single scalar value, ETO reflects the following properties:

1) Reliability: ETO indicates the expected amount of effort required to successfully deliver a message to the intended receiver. In particular, a higher ETO represents lower reliability in a link.

2) Channel Utilization: ETO indicates the expected amount of time spent utilizing the channel to deliver a message to the intended receiver. In particular, a higher ETO represents increased channel utilization.

3) Latency: ETO indicates the expected amount of time to deliver a message to the intended receiver. In particular, a higher ETO represents increased link latency.

4) Throughput: ETO also reflects differences in transmission data rate. In particular, a higher ETO may represent a lower data rate.

===Discovering Neighbors===

Figure 5A:
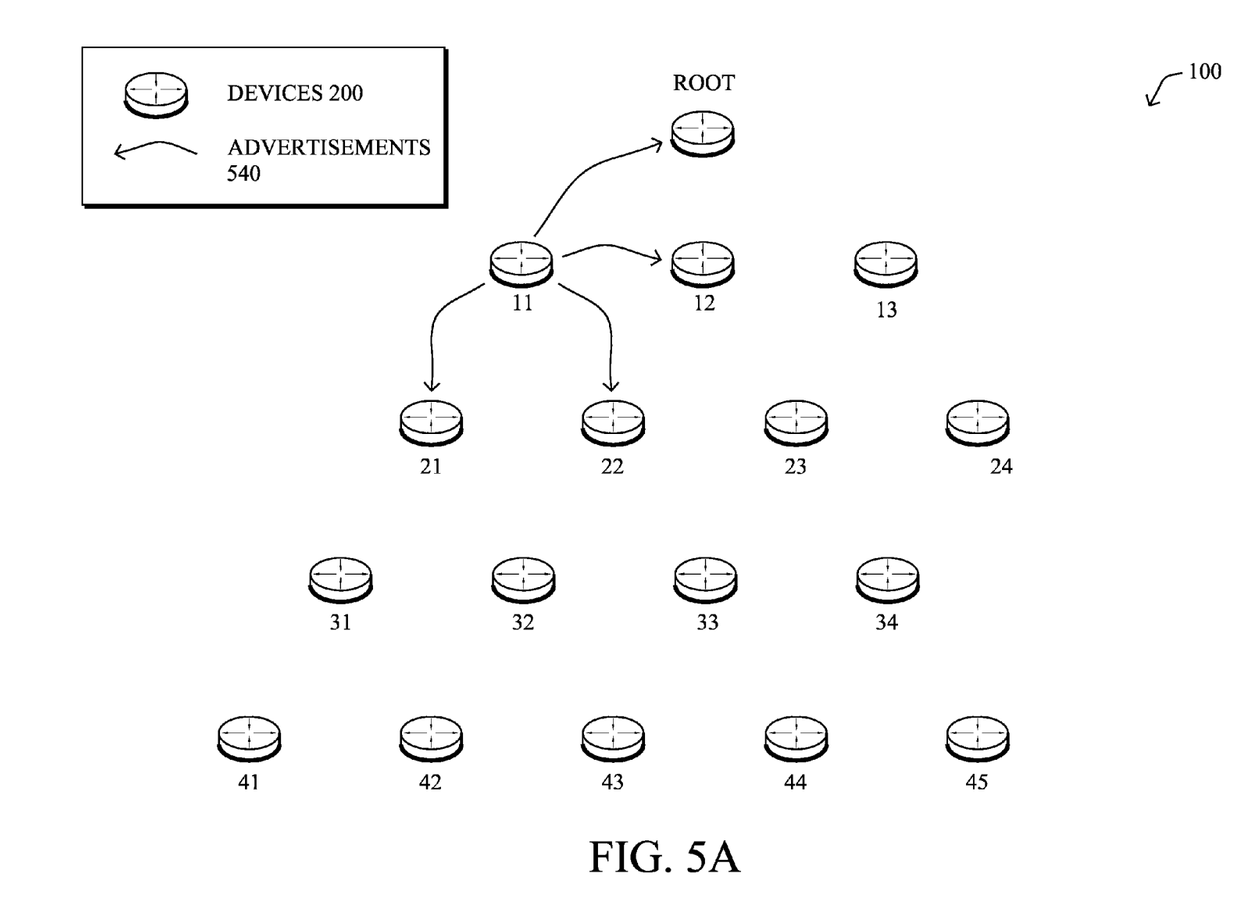
FIGS. 5A-5B illustrate example advertisements transmitted at different data rates.

As noted above, an LLN routing protocol (e.g., RPL) may periodically transmit advertisement messages to allow devices to discover neighboring routers (the transmitters of the advertisements). According to the techniques herein, the advertisement messages contain route cost information (i.e., ETO) for any available paths advertised within that message. For example, FIG. 5A illustrates an example transmission of advertisements 540 into the network, e.g., from node 11. Note that the transmission distance may be generally dependent upon the data rate used. Illustratively, in FIG. 5A, the advertisements 540 may reach generally local nodes, such as the root node, node 12, node 21, and node 22.

Figure 5B:
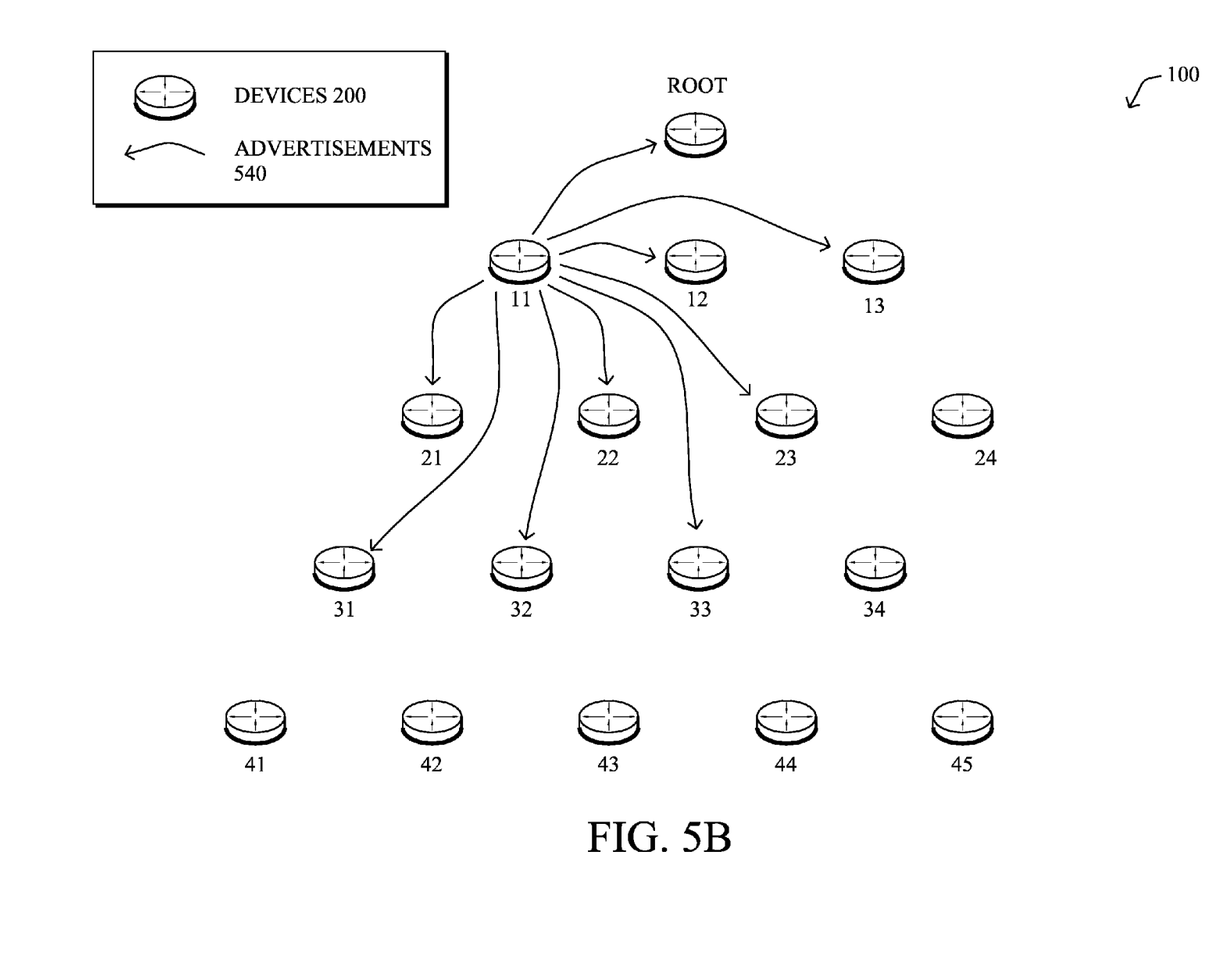

In one or more particular embodiments herein, the advertisement message 540 may be sent using the lowest data rate acceptable in the communication network (e.g., a configurable parameter). For instance, as shown in FIG. 5B, by advertising with the lowest transmission data rate, devices can discover neighboring devices that are reachable using the data rate that provides maximum transmission range. For example, in FIG. 5B, additional devices, such as node 13, node 23, node 31, node 32, and node 33, may be able to receive the advertisements 540, accordingly.

Note that when receiving an advertisement message 540, the device also records one or more signal quality metrics, such as a received signal strength indication (RSSI) and/or a signal-to-noise ratio (SNR) for the received message. The RSSI/SNR information can help a device determine what data rates may be used when transmitting messages to the device that sent the advertisement message, as described in the following section.

===Determining Link Transmission Data Rates===

According to one or more embodiments herein, the link layer automatically determines the transmission data rate when sending a message to a neighboring device. The link layer's goal is to adjust the data rate of the link based on the ETO, particularly to choose a data rate that minimizes the link ETO metric. Choosing a high data rate may decrease the reliability and thus increase the ETO value. Choosing a data rate too low decreases the throughput may thus increase the ETO value. As a result, the link layer may choose a data rate that optimizes reliability, channel utilization, latency and throughput simultaneously.

Figure 6:
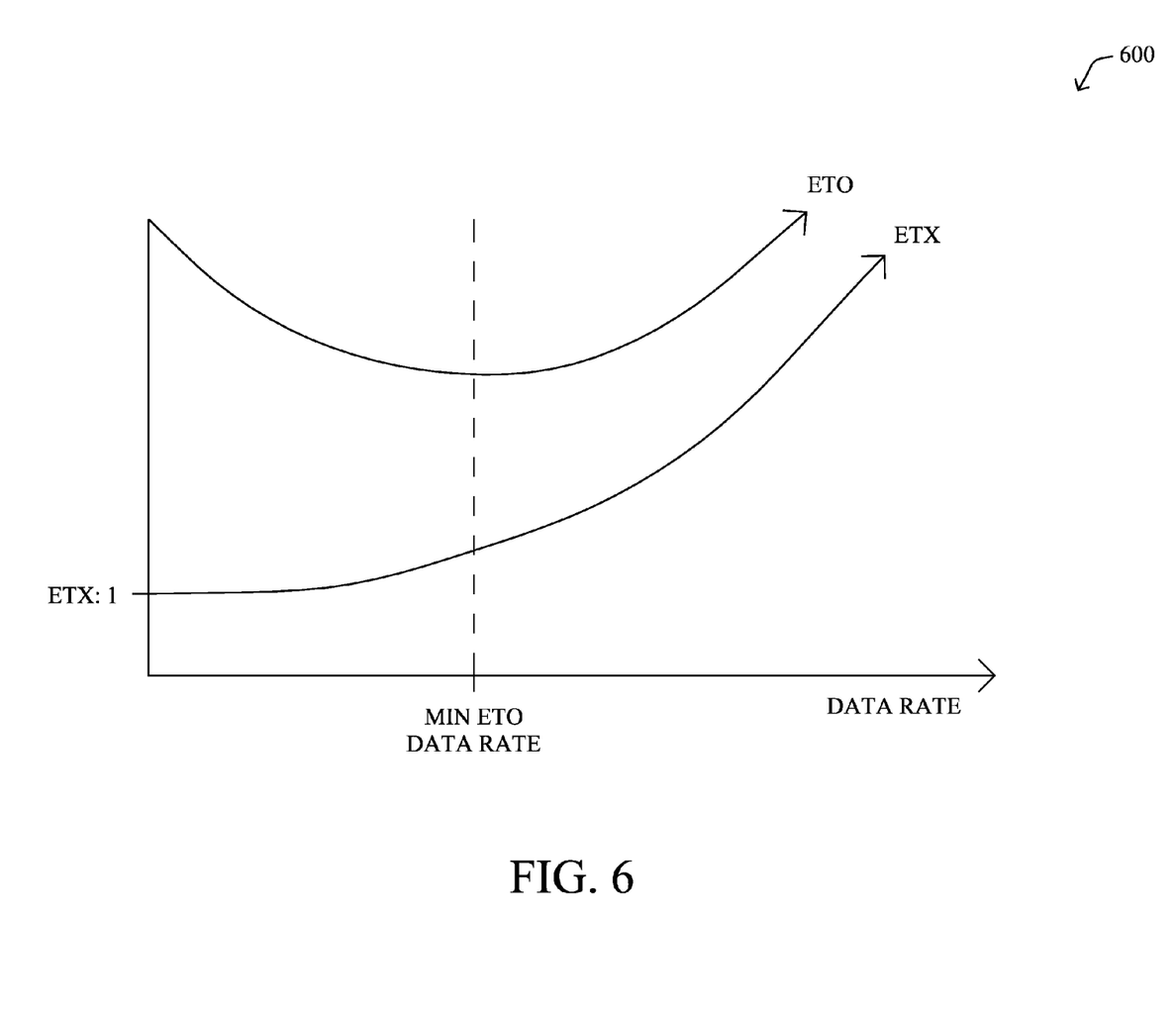
FIG. 6 illustrates an example representation of estimated transmission overhead (ETO) as it relates to data rate.

FIG. 6 illustrates an example graph 600 showing a relationship between the ETO and the data rate. In particular, lower data rates may result in a lower ETX value, e.g., remaining at "1" up to a certain higher data rate, when the reliability of the link may begin to suffer. At some point, the ETO value may reach its lowest point, e.g., once the reliability (ETX) begins to suffer greatly due to the higher data rate, and the trade-off between the data rate and the ETX becomes undesirable. Note that the exact relationship shown in FIG. 6 between the data rate, ETX, and ETO is not meant to be to scale, nor to represent actual values, and is simply a representative illustration for discussion regarding the general relationship between the values that is not meant to limit the scope of the embodiments herein.

The link layer (e.g., an embodiment of the "ETO process 248") may use various different methods to determine the proper data rate, generally relating to determining a plurality of ETO values for the link, each corresponding to a different available data rate for the link.

Figure 7:
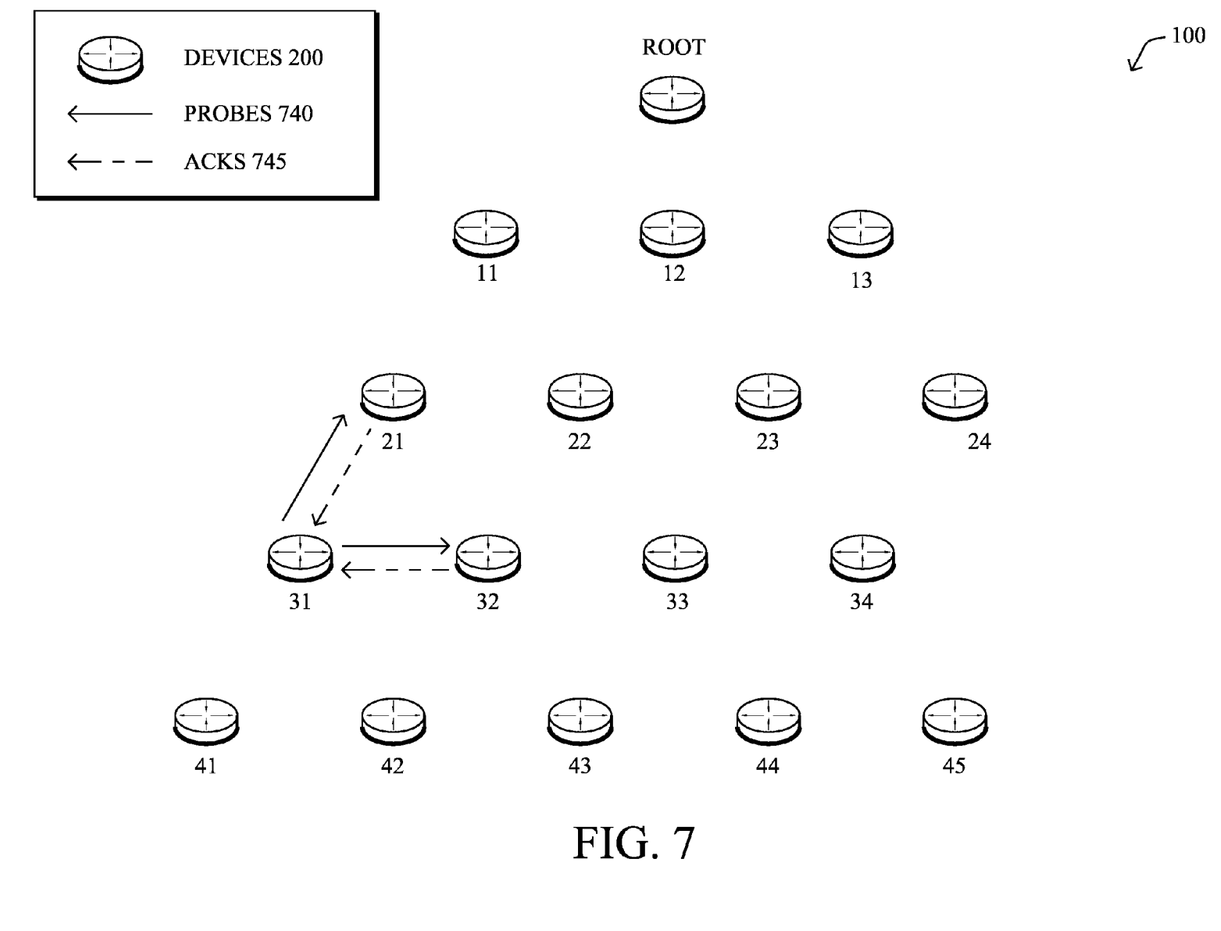
FIG. 7 illustrates an example of probe messages.

In a first example embodiment, LLN devices may measure the link ETO for different transmission data rates directly by transmitting probe messages, e.g., at each available data rate, and using observations to calculate the ETO. While this method uses real data to calculate the ETO, it also incurs overhead and delay because the device must transmit a number of messages. For example, as shown in FIG. 7, probe messages 740 may be used (e.g., by node 31) to determine a resultant ETX value for a particular link (or path) for each corresponding data rate probed, e.g., based on returned acknowledgments (ACKs) 745, or otherwise determinable.

In a second example embodiment, LLN devices may utilize a preconfigured model (e.g., stored as a data structure 245) that describes a typical tradeoff between data rate and reliability, such as a relationship between data rates and signal quality metrics. For example, one model may simply indicate that doubling the data rate results in a 6 dB reduction in receive sensitivity. Then by extrapolating from the RSSI/SNR values obtained when receiving advertisement messages, i.e., applied the known signal quality of the link to the model, a device can estimate what the ETO will likely be for various data rates. This method allows devices to make more informed decisions without generating any traffic, but does not actually measure the ETO of a link.

According to one or more additional example embodiments, a particular implementation may utilize both of the example methods above to benefit from each of their advantages. In particular, an initial model can be computed using extensive empirical data across different environments. LLN devices could then be configured with the initial model in the factory. Once deployed, the device could then refine the preconfigured model over time to adapt to deployment-specific environmental conditions, i.e., based on the resultant ETX at each correspondingly probed data rate.

With an understanding of the link ETO value for different transmission data rates, the LLN device can then choose the data rate that results in the minimum ETO value for each neighboring device. The link layer utilizes the chosen data rate when transmitting messages. Because the ETO measures reliability, channel utilization, communication latency, and throughput using a single scalar value, minimizes the ETO serves to optimize all of those metrics simultaneously.

In attempt to continuously optimize a given link, the routing protocol may choose to transmit to a neighboring device using a different data rate temporarily. In doing so, the routing protocol can attempt to search for another data rate that provides a lower link ETO metric over time. For example, if the ETX increases to cross a pre-determined threshold, the node may start to dynamically lower its data rate while observing the ETO, and stops when the ETO starts to increase again, in an attempt to tune the data rate so as to minimize the ETO. Alternatively, if the ETX remains the same for an extended period of time, the node may decide to increase the data rate until the ETX begins to suffer, thus decreasing the ETO further until that point. In this manner, the various ETO values may be determined by incrementally adjusting the data rate for the link for transmission of data traffic, i.e., increasing or decreasing, and therefore determining a resultant ETX at each correspondingly adjusted data rate based on the data traffic to compute the associated ETO.

===Dynamic Selection of a Routing Metric Reporting Technique (Aggregated Versus Recorded)===

The illustrative reference noted above, "Routing Metrics used for Path Calculation in Low Power and Lossy Networks" (draft-ietf-roll-routing-metrics) proposes two techniques to announce path cost in a LLN: (1) aggregated metrics: similarly to ISIS, OSPF or RIP a path cost is the sum of the costs of each link along the path; and (2) recorded metrics: where, the path costs is reported in the form of a vector recording the cost of each traversed links. The major advantage of recorded metrics is that it provides a much more accurate view of the path cost. In many cases, it might be preferable to choose a higher total cost path instead of a path with lower total cost but traverses very "bad" links. That being said, recorded metrics comes at the price of extra control plane overhead, which may be costly in LLN. The techniques herein, therefore, may dynamically determine the most appropriate routing metric reporting technique that would provide an accurate view of the path quality while minimizing control plane cost when appropriate.

To determine whether to advertise an aggregated path ETO or a recorded path ETO, the techniques herein base the decision on a variance of link ETOs in the network, e.g., across a particular path. In one example embodiment, the system may start with recorded metrics. For instance, in the case of the RPL routing protocol, the DAG root could specify a new flag indicating to all nodes the routing metric reporting technique of choice (aggregated versus recorded). The system may then enter into a monitoring phase where nodes would report their recorded path cost to the decision maker (e.g., the DAG root in the case of RPL). If the decision maker determines that link costs (ETO) are somewhat similar (cost variance< predetermined threshold), it can then switch to the aggregated routing metric strategy, thus reducing the control plane overhead while avoiding the downside effect of aggregated path cost.

Figure 8:
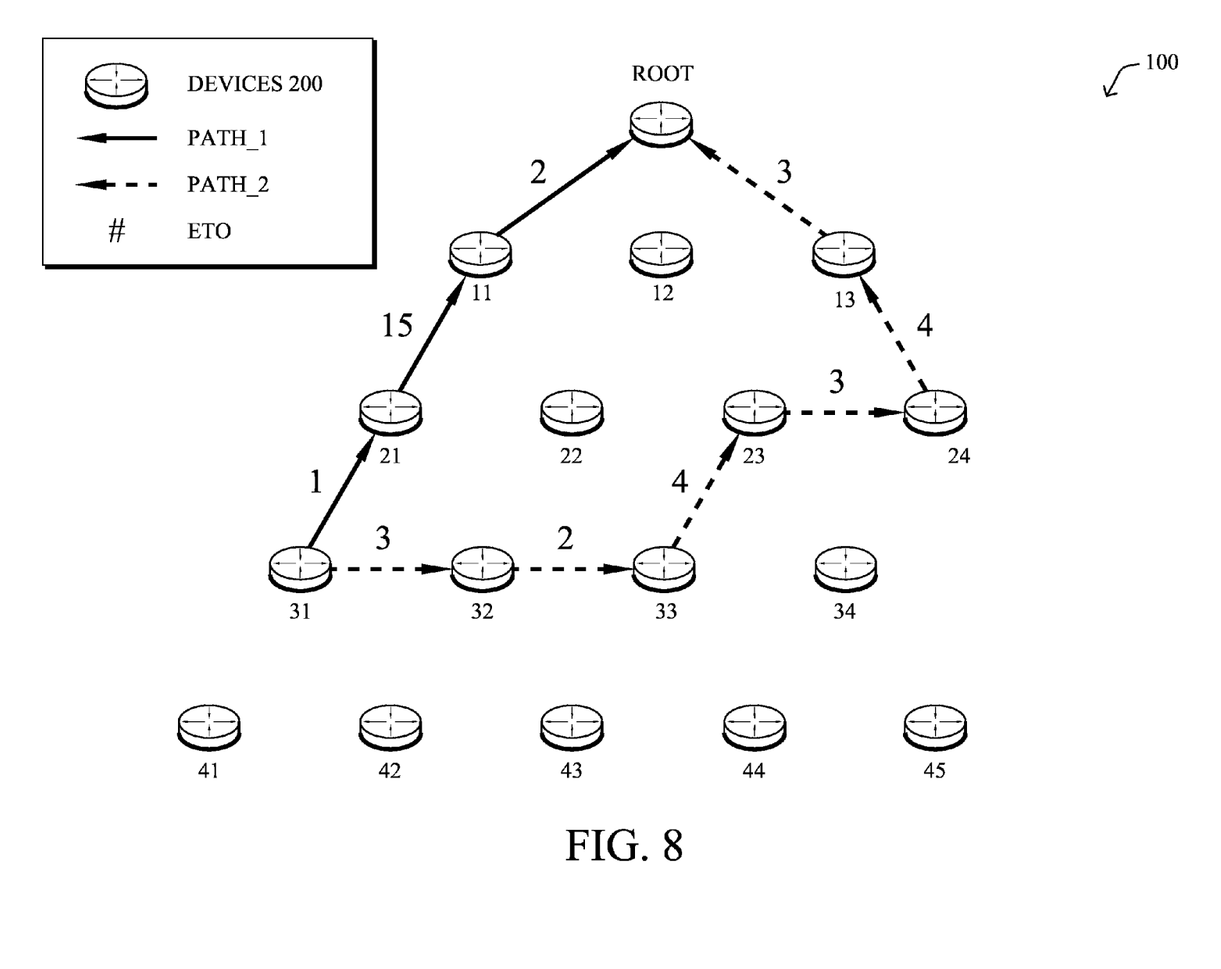
FIG. 8 illustrates an example of path costs (ETO)

Consider the following example, as illustrated in FIG. 8, where a node receives two routes with the following recorded metrics:
Path_1: Nodes 31-21-11-root (total cost=1+15+2=18);
Path_2: Nodes 31-32-33-23-24-13 root (total cost=3+2+4+3+4+3=19).

Node 31 receives an advertisement of Path_1 and Path_2. With an aggregated metric, 31 would select Path_1 (lower cost), thus sending packets through a very "bad" link (link 21-11). By observing the recorded link metrics, the "decision maker" (e.g., DAG root for RPL) could determine that the variance is too high to switch to aggregated (e.g., additive metrics). On the other hand if that variance is below some pre-determined threshold, the system could switch to aggregated metrics. Route selection, described below, may then be based on the lowest cost, and also on some threshold of maximum cost (or maximum variance) among individual link costs.

===Route Selection===

According to the techniques herein, the link layer projects the ETO information to the network layer such that an LLN routing protocol can utilize the information in selecting routes through the communication network, i.e., based on ETO values of one or more links of the route. That is, using the ETO information projected from the link layer, the routing protocol estimates the path ETO for routing through different neighbors. Specifically, when a device receives an advertisement message 540, described above, the link layer can compute a route estimate for the link ETO to that neighbor using RSSI/SNR information of the advertisement message. The routing protocol can then add the estimated link ETO to the path ETO advertised by that neighbor to estimate a path ETO for routing through that neighbor to the desired destination.

With estimates of the path ETO for routing through different neighbors, the routing protocol can focus on those candidates that are likely to provide the lowest path ETO values. In other words, the routing protocol ignores those neighbors that have a high estimated path ETO relative to the other neighbors. As mentioned above, certain links or paths may also be ignored that have an ETO that crosses some threshold of maximum cost or maximum variance among individual link costs. In one or more embodiments herein, the routing protocol (e.g., routing process 244) may then have the link layer measure the actual ETO to those remaining candidate neighbors by generating probe messages 740. By using RSSI/SNR and reliability observations from the probes, the routing protocol may then choose to adjust the data rate (e.g., up or down) in attempt to achieve a lower ETO, as described above.

Once the routing protocol is satisfied with the confidence in the local link's ETO value, it may choose whether or not to route through that neighbor based on link/path costs (e.g., based solely on ETO, or else based on ETO in addition to one or more other link metrics and/or constraints). In some system configurations, the routing protocol may trust the preconfigured model enough to use the route via the local link immediately. In other system configurations, the routing protocol may spend significant effort and time to gain confidence in the local link's ETO value.

Figure 9:
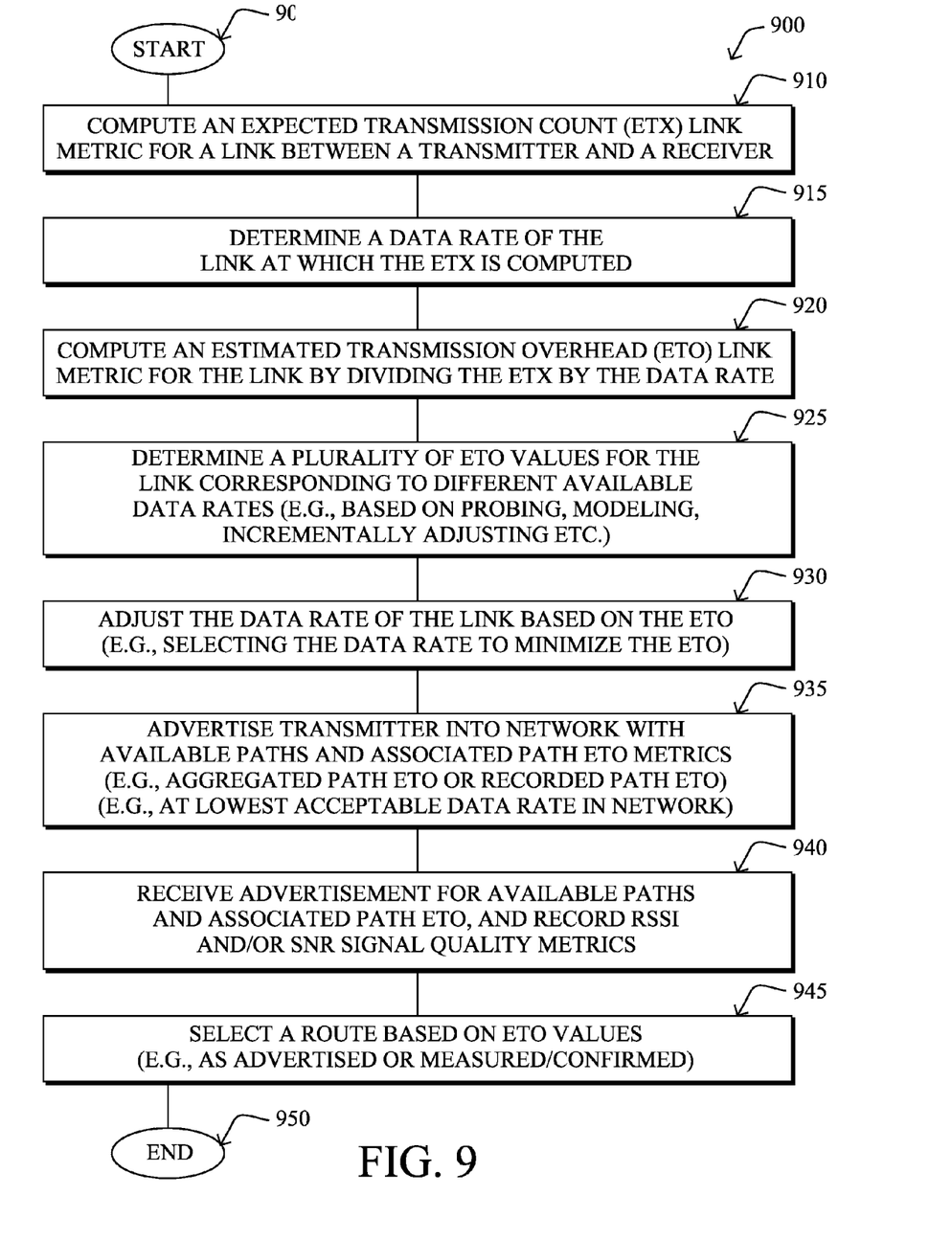
FIG. 9 illustrates an example simplified procedure for computing and using ETO link metrics with variable data rate links in the communication network.

According to one or more of the illustrative embodiments described in detail above, FIG. 9 illustrates an example simplified procedure for providing and using an ETO link metric with variable data rate communication links in accordance with one or more embodiments described herein. The procedure 900 starts at step 905, and continues to step 910, where, as described in greater detail above, an expected transmission count (ETX) link metric is computed for a link between a transmitter and a receiver at a particular data rate determined in step 915. From these values, an estimated transmission overhead (ETO) link metric may be computed for the link by dividing the ETX by the data rate, as described above. Note that in step 925, a plurality of ETO values may be determined for the link corresponding to different available data rates, for example, based on probing, modeling, incrementally adjusting, etc., as mentioned above. In one or more embodiments, based on the ETO, in step 930 the data rate of the link may then be adjusted, e.g., to select a particular data rate that minimizes the ETO.

According to one or more techniques above, in step 935 a transmitter may advertise itself into the network with available paths and associated path ETO metrics. In particular, as described above, the path ETO may be an aggregated or recorded path ETO, and may also be transmitted at the lowest acceptable data rate in the network, e.g., for maximum transmission range. Nodes may then receive the advertisements in step 940, and as detailed above, may record the RSSI and/or SNR signal quality metrics of the advertisements. Based on the advertisements and the ETO values, as well as local ETO values which may be trusted from the model or else measured and confirmed (refined), one or more routes through the network may be selected in step 945, accordingly. Alternatively, the route selection may be based on local ETO values only, e.g., to select a parent node in a DAG with limited knowledge beyond the local links.

The procedure 900 illustratively ends in step 950, though in practice may continue to any step described above, e.g., to compute new ETX values, adjust data rates, receive or transmit advertisements, etc. Also, it should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The novel techniques described herein, therefore, provide for an ETO link metric and its use with variable data rate communication links. In particular, through the use of the ETO metric, the techniques herein may simultaneously optimize reliability, channel utilization, communication latency, and throughput as described above, such as by choosing routes that minimize the path ETO metric. In addition, the techniques herein provide for selecting an effective data rate that minimizes the ETO, and may limit control traffic required to initialize the link ETO by initially using a configured model and then refining it over time based on actual observations in the implemented network.

It is important to note that while other technologies, such as WiFi, may adjust the data rate to make an appropriate tradeoff between throughput and communication range, such technologies typically operate in a star topology. As a result, these technologies do not need to operate a mesh routing protocol that can effectively optimize routes over links with variable transmission data rates.

While there have been shown and described illustrative embodiments that provide for an ETO link metric and its use with variable data rate communication links, it is to be understood that various other adaptations and modifications may be made within the spirit and scope of the embodiments herein. For example, the embodiments have been shown and described herein with relation to LLNs, and more particularly, to the RPL protocol. However, the embodiments in their broader sense are not as limited, and may, in fact, be used with other types of networks and/or protocols where variable data rate links are utilized. In addition, while the techniques generally describe localized ETO computation, a network management system/server (NMS) may also be used to provide intelligence to the network functions described herein, such that the NMS determines ETO values, adjusts data rates, etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   computing an expected transmission count (ETX) link metric for a link between a transmitter and a receiver in a communication network, the ETX representative of an expected number of transmissions necessary for a message to be successfully received by the receiver over the link;
   determining a data rate of the link at which the ETX is computed;
   computing an estimated transmission overhead (ETO) link metric for the link by executing the following equation: ETO=ETX/data rate; and
   adjusting the date rate of the link based on the ETO by selecting the data rate that minimizes the ETO.

2. The method as in claim 1, further comprising:
   determining a plurality of ETO values for the link, each ETO value of the plurality of ETO values corresponding to a different available data rate for the link.

3. The method as in claim 2, wherein determining the plurality of ETO values comprises:
   probing the link at each available data rate; and
   determining a resultant ETX at each corresponding data rate.

4. The method as in claim 2, wherein determining the plurality of ETO values comprises:
   utilizing a preconfigured model of a relationship between data rates and signal quality metrics as applied to a known signal quality of the link.

5. The method as in claim 4, wherein determining the plurality of ETO values further comprises:
   probing the link at each available data rate;
   determining a resultant ETX at each corresponding data rate; and
   refining the preconfigured model based on the resultant ETX at each corresponding data rate.

6. The method as in claim 2, wherein determining the plurality of ETO values comprises:
   incrementally adjusting the data rate for the link for transmission of data traffic; and
   determining a resultant ETX at each correspondingly adjusted data rate based on the data traffic.

7. The method as in claim 1, further comprising:
   advertising the transmitter into the communication network along with one or more available paths from the transmitter and an associated path ETO.

8. The method as in claim 7, further comprising:
   determining whether to advertise an aggregated path ETO or a recorded path ETO based on a variance of link ETOs across a particular path.

9. The method as in claim 7, wherein advertising comprises:
   advertising at a lowest acceptable data rate in the communication network.

10. The method as in claim 1, further comprising:
receiving an advertisement from a device in the communication network, the advertisement indicating one or more available paths from the device and an associated path ETO; and
recording at least one signal quality metric selected from a received signal strength indication (RSSI) and a signal-to-noise ratio (SNR).

11. The method as in claim 1, further comprising:
selecting a route through the communication network based on ETO values of one or more links of the route.

12. An apparatus, comprising:
one or more network interfaces to communicate in a communication network;
a processor coupled to the network interfaces and adapted to execute one or more processes; and
a memory configured to store a process executable by the processor, the process when executed operable to:
compute an expected transmission count (ETX) link metric for a link between the apparatus and a receiver in the communication network, the ETX representative of an expected number of transmissions necessary for a message to be successfully received by the receiver over the link;
determine a data rate of the link at which the ETX is computed;
compute an estimated transmission overhead (ETO) link metric for the link by executing the following equation: ETO=ETX/data rate; and
adjust the date rate of the link based on the ETO by selecting the data rate that minimizes the ETO.

13. The apparatus as in claim 12, wherein the process when executed is further operable to:
determine a plurality of ETO values for the link, each ETO value of the plurality of ETO values corresponding to a different available data rate for the link, the plurality of ETO values determined based on at least one of either:
i) probing the link at each available data rate, and determining a resultant ETX at each corresponding data rate;
ii) utilizing a preconfigured model of a relationship between data rates and signal quality metrics as applied to a known signal quality of the link; and
iii) incrementally adjusting the data rate for the link for transmission of data traffic, and determining a resultant ETX at each correspondingly adjusted data rate based on the data traffic.

14. The apparatus as in claim 12, wherein the process when executed is further operable to:
select a route through the communication network based on ETO values of one or more links of the route.

15. A tangible, non-transitory, computer-readable media having software encoded thereon, the software when executed by a processor operable to:
compute an expected transmission count (ETX) link metric for a link between a transmitter and a receiver in the communication network, the ETX representative of an expected number of transmissions necessary for a message to be successfully received by the receiver over the link;
determine a data rate of the link at which the ETX is computed;
compute an estimated transmission overhead (ETO) link metric for the link by executing the following equation: ETO=ETX/data rate; and
adjust the date rate of the link based on the ETO by selecting the data rate that minimizes the ETO.

16. The computer-readable media as in claim 15, wherein the software when executed is further operable to:
determine a plurality of ETO values for the link, each ETO value of the plurality of ETO values corresponding to a different available data rate for the link, the plurality of ETO values determined based on at least one of either:
i) probing the link at each available data rate, and determining a resultant ETX at each corresponding data rate;
ii) utilizing a preconfigured model of a relationship between data rates and signal quality metrics as applied to a known signal quality of the link; and
iii) incrementally adjusting the data rate for the link for transmission of data traffic, and determining a resultant ETX at each correspondingly adjusted data rate based on the data traffic.

17. The computer-readable media as in claim 15, wherein the software when executed is further operable to:
select a route through the communication network based on ETO values of one or more links of the route.

* * * * *